Jan. 29, 1952    R. M. LINDSAY ET AL    2,583,956
COUPLING STRUCTURE
Filed April 3, 1947    3 Sheets-Sheet 1
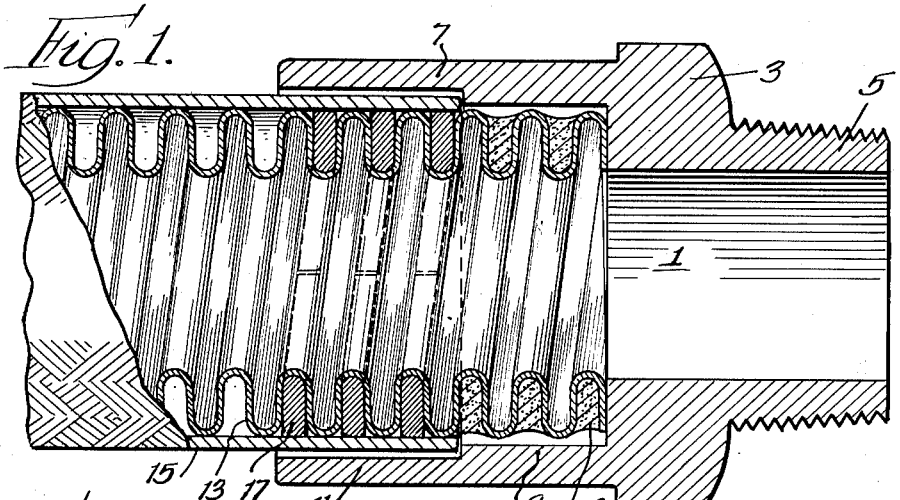
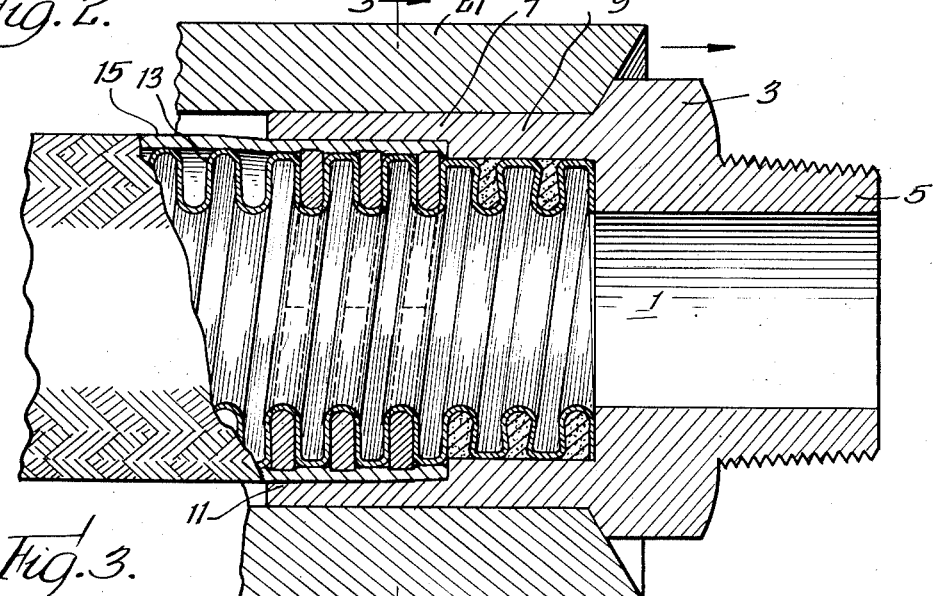
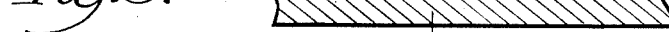
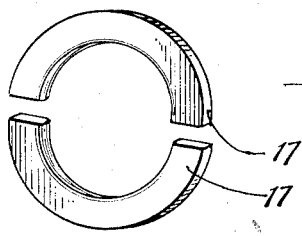
INVENTORS
Robert Monroe Lindsay
Charles Randazzo
By:- Moore, Olson & Trexler
attys.

Jan. 29, 1952 R. M. LINDSAY ET AL 2,583,956
COUPLING STRUCTURE
Filed April 3, 1947 3 Sheets-Sheet 2
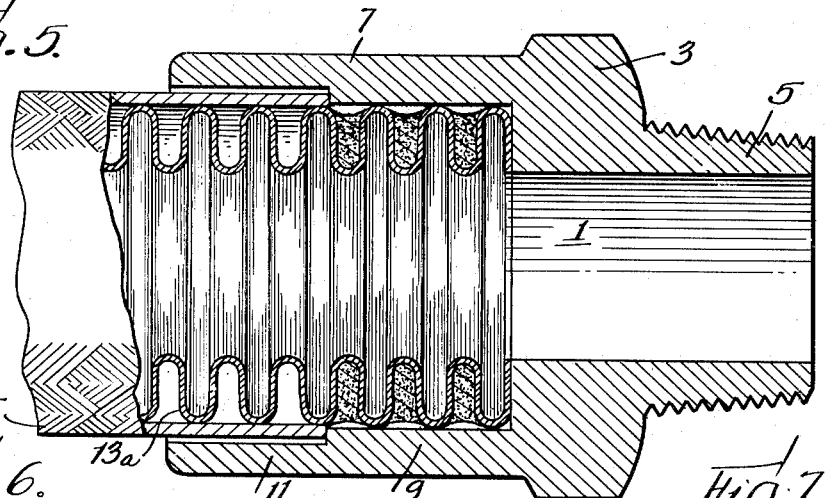
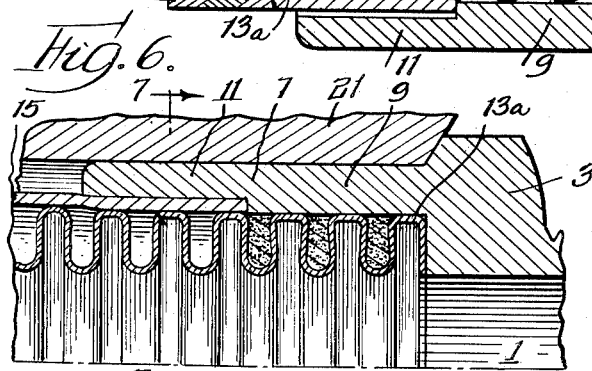
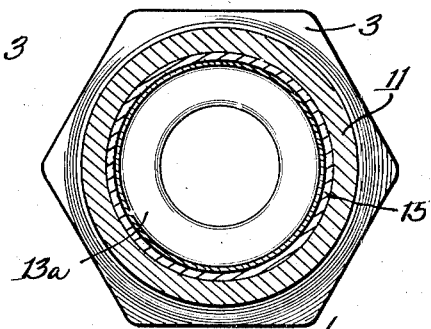
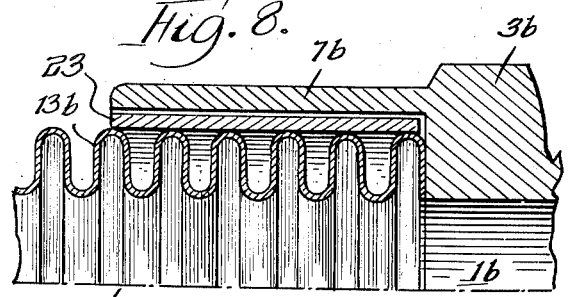
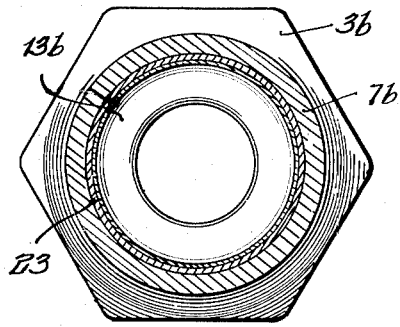
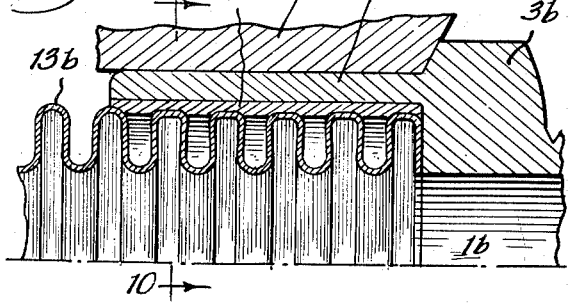
INVENTORS.
Robert Monroe Lindsay
Charles Randazzo
By: Moore, Olson & Trexler
Attys.

Jan. 29, 1952  R. M. LINDSAY ET AL  2,583,956
COUPLING STRUCTURE
Filed April 3, 1947  3 Sheets-Sheet 3
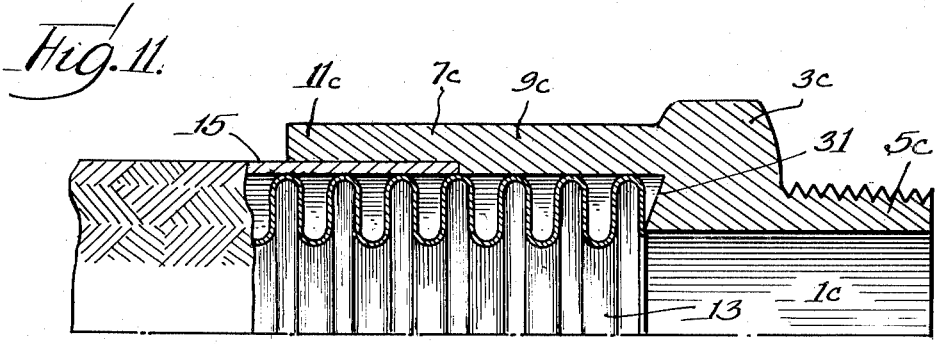
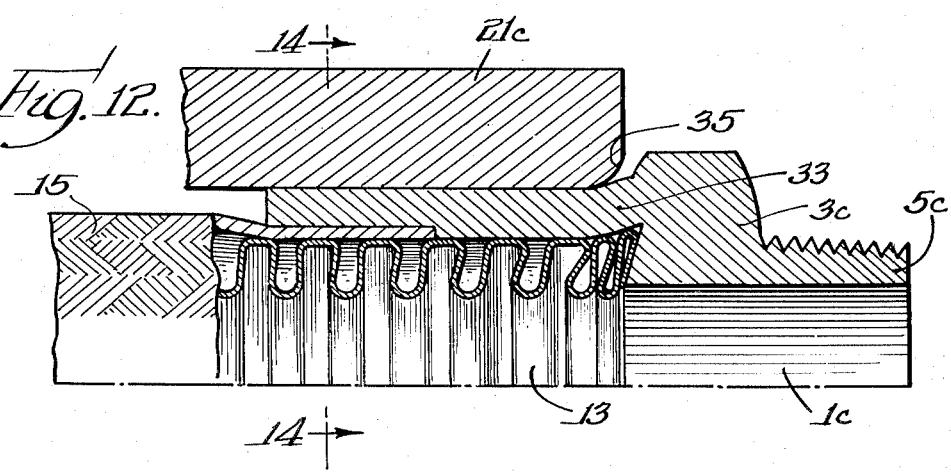
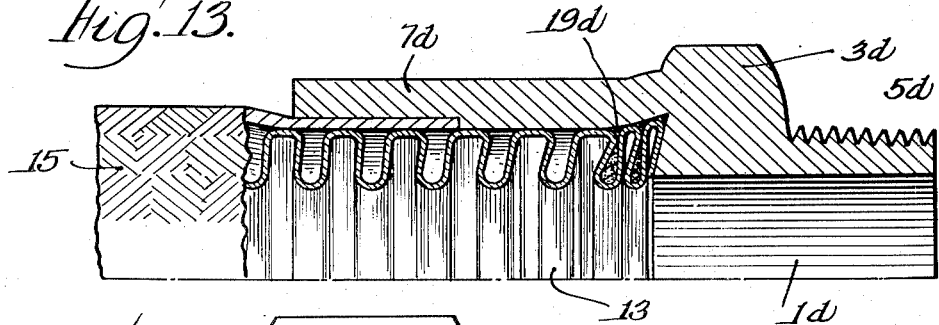
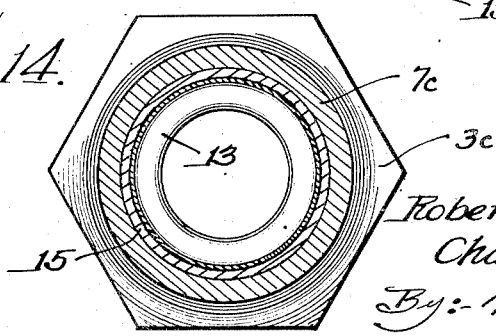
INVENTORS.
Robert Monroe Lindsay
Charles Randazzo
By:- Moore, Olson & Trexler
attys Patented Jan. 29, 1952

2,583,956

UNITED STATES PATENT OFFICE 2,583,956

COUPLING STRUCTURE

Robert Monroe Lindsay, Oak Park, and Charles Randazzo, Elmwood, Ill., assignors to Chicago Metal Hose Corporation, Maywood, Ill., a corporation of Illinois Application April 3, 1947, Serial No. 739,124

3 Claims. (Cl. 285—74)

The present invention relates to a coupling structure for use with flexible metal tubing or hose, and to the method of attaching the coupling to an end of such hose.

It is an object of the invention to provide an improved coupling for use with flexible metal tubing, which is simple and economical in construction, which provides an effective end seal for the tubing, and which can be attached to the end of the tubing in a minimum of time and with a minimum number of operations, thereby effecting a considerable saving in labor.

A further object of the invention is to provide a coupling for use with sheathing encased metal hose, which is constructed in such manner as to provide an improved fluid-tight seal between the coupling and the end of the flexible metal tubing to which it is attached, and an improved mechanical grip between the coupling and the sheathing, preferably by means of a single attaching operation.

Another object of the invention is to provide a coupling and hose assembly, and method of fabrication, which produces an improved fluid seal as well as an improved mechanical grip between the tubing and the coupling body.

Still another object of the invention is to provide a coupling of the type described, adapted for use with flexible convoluted metal tubing, wherein a fluid-tight seal and mechanical grip or interlock between the tubing and coupling, and a firm grip between the coupling and sheathing, where provided, is obtained through distortion and compression of the convolutions of the tube.

These and other objects of the invention will be better understood upon a perusal of the following specification taken in conjunction with the accompanying drawings, wherein:

Fig. 1 is a longitudinal cross sectional view showing the coupling of the present invention, in accordance with one embodiment thereof, placed over the end of a flexible metal tube, and before being pressed into engagement therewith;

Fig. 2 is a view of the coupling and tube shown in Fig. 1, after the coupling has been pressed into engagement with the hose;

Fig. 3 is a transverse sectional view of the coupling and tube of Fig. 2, on a somewhat reduced scale, and taken as indicated by the line 3—3 thereof.

Fig. 4 is a detail perspective view of one of the collars, formed of two separable portions, which may be employed in conjunction with the coupling;

Fig. 5 is a longitudinal cross sectional view of a modified embodiment of the invention showing the coupling placed over the end of a flexible metal tube, and before being pressed into engagement therewith;

Fig. 6 is a view of a portion of the coupling and tube disclosed in Fig. 5, after the coupling has been pressed onto the tube;

Fig. 7 is a reduced scale transverse sectional view of the tube and coupling shown in Figs. 5 and 6, taken as indicated by the line 7—7 of Fig. 6;

Figs. 8–10 are views illustrating a third embodiment of the invention, Figs. 8 and 9 showing the coupling body prior to and after compression, and Fig. 10 being a reduced scale transverse sectional view of the structure taken as indicated by the line 10—10 of Fig. 9;

Figs. 11 and 12 are views of a still further structural embodiment of the invention showing the coupling body and hose prior to and after compression;

Fig. 13 is a view similar to Fig. 12, but showing the additional incorporation of a sealing compound; and Fig. 14 is a reduced scale transverse sectional view of the structure of Fig. 12 on the line 14—14 thereof.

Described briefly, the embodiment of the invention illustrated in Figs. 1–4 comprises a coupling having an annular or cylindrical flange extending therefrom which is provided with stepped portions of different inside diameters. The flange portion of the coupling is placed over the end of a flexible convoluted metal tubing having an outer sheathing which is terminated short of the end of the tubing a distance substantially equal to the width of the portion of the flange having the smaller inside diameter; the difference between the internal diameters of the two stepped portions of the flange being preferably slightly more than twice the thickness of the sheathing provided over the flexible metal tubing. The coupling is attached to the hose and sheathing by pressing the annular flange portion of the coupling radially inward, whereby the portion of smaller inside diameter compresses the convolutions in the portion of the tubing which extends beyond the sheathing to form a fluid-tight seal and mechanical grip therewith; and the portion of the annular flange having the greater inside diameter firmly clamps the sheathing to the tubing to prevent axial movement therebetween, to further insure a strong mechanical connection between the coupling and tube.

Referring now more in particular to the drawings, wherein like reference numerals refer to like parts throughout, the coupling indicated generally at 1, Fig. 1, which coupling may be formed of brass or similar malleable metal, comprises a hexagonal body portion 3 having a threaded annular flange 5 extending from one side thereof, for attachment to a pipe, tank or other suitable connection. The coupling is provided with an annular flange 7 extending from the other side thereof for attaching the coupling to a hose. It should be understood that the portion 5 of the coupling 1 is not limited to the form illustrated, but may have any desired shape to suit particular requirements. The annular flange 7 includes portions 9 and 11 of different inside diameters.

The coupling 1 is shown placed over a flexible metal tubing 13, which in this instance is illustrated as having a helical convolution therein to provide flexibility. The tubing is encased in a sheathing 15, which sheathing may be a wire braid adapted to withstand the axial forces created by the transmission of fluids through the tubing under pressure. The tubing 13 may be formed of copper, brass, stainless steel, or other alloys or metals.

In order that the sheathing 15 shall be enabled to take up the axial forces tending to elongate the tubing 13, it is necessary that such sheathing be rigidly anchored to the tubing at each end. In order to prevent leakage of fluid from the coupling, it is essential that a fluid-tight seal be obtained between the coupling 1 and the tubing 13.

To facilitate obtaining a firm mechanical grip on a sheathing 15, the convolutions of that portion of tubing 13 which is disposed within the portion 11 of the annular flange 7 may have one or more collars 17 disposed therein. These collars may be constructed in the form of separable semi-circular metallic rings, as illustrated in Fig. 4. When the flexible tubing 13 is provided with a helical convolution, as has been illustrated in Fig. 1, alternatively, the collar 17 may be constructed in the form of a helix which is threaded over the end of the tubing and beneath the sheathing encasing the tubing.

In order to facilitate the production of a positive fluid-tight seal between the coupling 1 and the end of the tubing 13, the convolutions in the tubing at the end thereof are filled with a filler 19. The filler may be ductile material such as solder, rubber, or a cement which is applied in paste-like form and subsequently hardens. When cement is used, it is preferred that it should be a semi-hardening type which does not acquire a permanent set, but instead remains somewhat resilient in order to insure a fluid-tight seal irrespective of the expansion and contraction of the tubing 13 and coupling 1 which occurs with variations in temperature. The filler material provides an impervious seal between the coupling and the tube, and may be used whether the tubing convolutions are annular or helical. In the case of helical tubing, the filler also blocks the spiral of the convolution which would otherwise be a path of fluid escape.

The coupling 1 is secured to the tubing 13 in fluid-tight relation, at the same time that the sheathing 15 is gripped mechanically between the coupling and the tubing, by pressing the annular flange portion 7 of the coupling radially inward. This may be accomplished by means of rollers which rotate about the outer circumference of the flange 7 and are moved radially inward during such rotation; or the flange portion 7 may be pressed inwardly by means of a split die 21 which is first closed over the tubing 13 and is then moved in an axial direction over the flange 7, as has been illustrated in Fig. 2.

Thus, in a single operation, the sheathing 15 is firmly gripped between the portion 11 of flange 7 and the collar or collars 17, as well as between the flange portion 11 and the convolutions of tubing 13. Simultaneously the convolutions of tubing 13 disposed within the portion 9 of flange 7, and the filling material 19, are pressed inwardly to form a fluid-tight seal. The use of the collar or collars 17 insures a firm mechanical grip on the sheathing 15, since the stress created by the radial compression of portion 11 of flange 7 is concentrated within the comparatively narrow width of the collars, and the collars may be made of hardened material, causing them to bite into the sheathing. Inasmuch as the tubing 13 is mechanically secured to the coupling 1 within the portion 11 of flange 7, a reduced axially directed force is produced between the coupling and the portion of tubing 13 which forms a fluid-tight seal therewith, as the structure is stressed in service, thereby precluding any possibility of the seal being rendered ineffective due to movement between the parts forming such seal.

In the embodiment of the invention illustrated in Figs. 5–7, a flexible metal tubing 13a, provided with annular convolutions, has been illustrated. In the case of a tubing having annular convolutions, it is not essential to fill the convolutions at the end of the tubing, as in the case of a helically convoluted tubing, but such filler may be employed, as previously pointed out, to provide a more positive seal. In the structure shown, no annular collar or collars have been provided within the portion 11 of flange 7, but it is to be understood that such collar or collars may be employed, in the same manner as illustrated in Fig. 1, if desired.

The coupling 1 is attached to the tube 13a in the same manner as heretofore described, and as is illustrated in Fig. 6.

The embodiment of the invention illustrated in Figs. 8–10 is intended particularly for use where the tubing metal is relatively hard, so that a proper seal would not be effected by metal to metal contact between the tube and the coupling body. In the embodiment shown, no sheathing is provided, so it is unnecessary to provide steps in the annular flange 7b.

In instances, as stated, where the tubing 13b is formed of hard metal, it is preferred to provide a sleeve 23 of relatively softer material which is placed over the end of tubing 13d before coupling 1b is placed thereover. The sleeve 23 may be formed of soft copper, lead, rubber, plasticized synthetic resin, or other ductile material. When the annular flange 7b is pressed radially inward, the sleeve 23 becomes deformed as the tube convolutions are also deformed, to fit snugly about the convolutions of tubing 13b, thereby providing a fluid-tight seal and firm mechanical grip between the tubing and the coupling 1b. The coupling 1b is attached to the tubing 13b in the same manner as heretofore described, and as has been illustrated in Fig. 9, by die pressing the flange 7b radially inward against the convolutions of the tubing.

In Figs. 11, 12 and 14 an embodiment of the invention is shown wherein a part of the flange portion of the coupling body remains uncompressed, thereby producing a wedge-like annular recess or chamber into which the extreme hose end is extended or expanded so as to provide a positive mechanical interlock between the hose and the coupling body, resistant to axial pulling stresses upon the hose; and further to provide a fluid-tight end seal between the hose end and the coupling body. Coupled with these features, the shaping of the compressing die is such, and the magnitudes and manner of compression are such as to cause the hose convolutions to flow slightly toward the tubing end, as the convolutions are axially compressed, whereby to promote the axial compression of the hose end against the abutting coupling wall, to promote the production of a fluid-tight connection.

More particularly, referring to Figs. 11, 12 and 14, it will be seen that the coupling body as indicated at 3c may be shaped in a manner generally similar to that heretofore described in reference to Fig. 1, said coupling body having a flange portion 9c to receive the end convolutions of the tubing, and a flange portion 11c to receive the end of the sheathing or braid, and the hose convolutions encased thereby. The tubing 13 is illustrated in this instance as being of the annularly convoluted type, and the encasing sheathing or braid is indicated by the reference numeral 15, as in the previously described embodiments.

As particularly shown in Fig. 11, the end wall 31, against which the tubing end is abutted, is reversely tapered, preferably at an angle of about 20°, as shown.

In compressing the coupling flange onto the tubing and braid, as shown in Fig. 12, the axial movement of the split compressing die 21c is terminated short of the end of the flange, thereby leaving a part of the flange portion, as indicated at 33, which substantially retains its original size and shape. As the compressing operation takes place, the extreme end convolutions of the tubing become interlocked within the annular chamber defined by the flange portion 33, thus providing a positive mechanical interlock between the tubing convolutions and the coupling body, precluding the axial withdrawal of the tubing from the coupling body as the parts are stressed in service. More particularly, the diameter of the extreme end convolutions of the tubing is larger than the inner diameter of the compressed portion of the coupling flange, whereby to produce a positive mechanical interlock, as stated.

Furthermore, the end of the compressing die is so shaped, as indicated at 35, and the magnitude of the coupling flange compression is so arranged that such axial pitch increase or axial gravitation as may occur between the convolutions of the tubing as the convolutions are radially compressed is all reflected in an axial movement of the tubing toward the annular recess defined by the coupling flange portion 33, thereby compressing the tubing convolutions firmly against the coupling wall 31 so as to provide a fluid-tight seal. In other words, the extreme end convolutions of the tubing lying within the annular chamber defined by the coupling flange portion 33 become both radially expanded and axially compressed in respect to the normal size and spacing of the convolutions, and in respect to those tubing convolutions which lie within the compressed flange portion, thereby producing at the extreme tubing end both a positive mechanical interlock between the tubing and the coupling body, and also a tight compression engagement between the extreme end of the tubing and the coupling wall 31 so as to provide a fluid-tight connection. The angularity of the wall 31, previously mentioned, cooperates in this respect to aid in providing fluid-tight abutting engagement, as well as in causing the tubing convolutions to be expanded or jammed into the defined annular chamber.

It is to be noted that the fluid seal provided is in effect an end seal between the tubing and coupling body, as distinguished from a side seal therebetween.

In Fig. 13 a structural arrangement is shown, the same as in Fig. 12 except that a sealing compound is provided as indicated at 19d and so as to aid in producing a fluid-tight connection between the hose end and the coupling body. As previously pointed out, this sealing compound may either be metallic or non-metallic, and of any suitable material, as desired.

It should be apparent that by reason of the novel features of construction of the coupling disclosed herein, a very simple and economical coupling for use with flexible convoluted metal tubing has been provided, which is particularly adapted to form a mechanically strong and fluid-tight seal between the coupling and the tubing; and to firmly grip a sheathing encasing such tubing, as an incident to a rapid and economical attachment of the coupling.

While the invention has been illustrated by the disclosure of particular embodiments thereof, it is obvious that other modifications are possible, and therefore the aim of the appended claims is to cover all such modifications as fall within the true spirit and scope of the invention.

Having thus described the invention, what is claimed as new and desired to be secured by Letters Patent is:

1. In combination with a flexible convoluted metal tubing having crest and trough portions and a sheathing terminating short of the end thereof, the provision of a coupling member having a radially compressible cylindrical flange encompassing the adjacent end of the tubing inserted therein, said flange including an intermediate inwardly directed radial shoulder juxtaposing the adjacent end of the sheathing and defining an outer cylindrical flange portion of larger diameter and an inner cylindrical flange portion of lesser diameter, a filler material within a trough of the tubing exposed outwardly of the terminal end of the sheathing and within the inner cylindrical flange portion of lesser diameter, and said flange being radially compressed to flatten the exposed crest portions of the tubing and said filler material against the said inner flange portion of lesser diameter and to flatten the crest portions within the outer flange portion of larger diameter against the interposed sheathing.

2. In combination with a flexible convoluted metal tubing having crest and trough portions and a sheathing terminating short of the end thereof, the provision of a coupling member having a radially compressible cylindrical flange encompassing the adjacent end of the tubing inserted therein, said flange including an intermediate inwardly directed radial shoulder juxtaposing the adjacent end of the sheathing and defining an outer cylindrical flange portion of larger diameter and an inner cylindrical flange portion of lesser diameter, said flange being radially compressed to flatten the exposed crest portions of the tubing against said inner cylindrical flange portion of lesser diameter and to flatten the crest portions of the tubing within said outer cylindrical portion against the interposed sheathing, said coupling member at the inner end of the flange portion of lesser diameter having an inwardly and axially outwardly extending conical shoulder portion for receiving and compressing adjacent convolutions of the tubing when the said flange portion is compressed thereagainst.

3. In combination with a flexible convoluted metal tubing having crest and trough portions and a sheathing terminating short of the end thereof, the provision of a coupling having a radially compressible flange encompassing the adjacent end of the tubing inserted therein, said flange including an intermediate radial shoulder juxtaposing the adjacent end of the sheathing and defining an outer flange portion of larger diameter and an inner flange portion of lesser diameter, a collar disposed in a trough of the tubing within the portion of the sheathing encompassed by the outer flange portion, a filler material within a trough of the tubing outwardly of the terminal end of the sheathing and within the inner flange portion of lesser diameter, and said flange being radially compressed to flatten the exposed crest portions of the tubing and said filler material directly against the said inner flange portion of lesser diameter and to flatten the adjacent crest portions within the outer flange portion of larger diameter against said sheathing, and to embed said collar in said sheathing to provide a mechanical interlock therewith.

ROBERT MONROE LINDSAY.
CHARLES RANDAZZO.

REFERENCES CITED

The following references are of record in the file of this patent:

UNITED STATES PATENTS

| Number | Name | Date |
|---|---|---|
| Re. 19,865 | Eastman | Feb. 25, 1936 |
| 996,899 | Witzenmann | July 4, 1911 |
| 1,121,624 | Cowles | June 21, 1938 |
| 2,216,468 | Farrar | Oct. 1, 1940 |
| 2,399,790 | Conroy | May 7, 1946 |

FOREIGN PATENTS

| Number | Country | Date |
|---|---|---|
| 225,220 | France | Sept. 29, 1908 |